Figure 4:
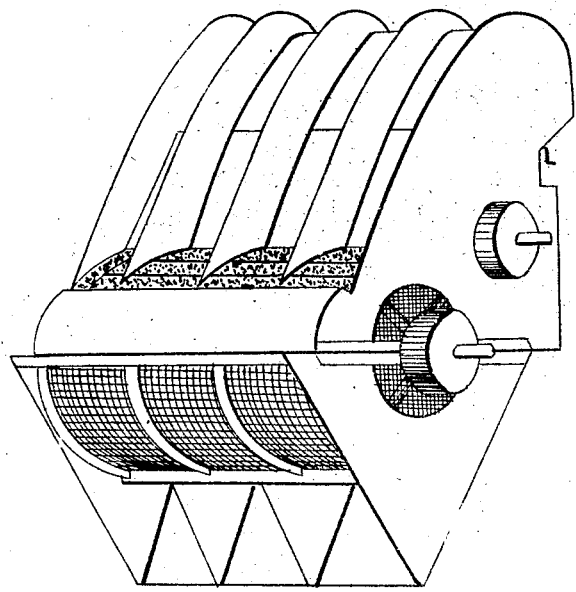

J. HOLLINGSWORTH.
Mill Bolt.
No. 8,527.
3 Sheets—Sheet 1.
Patented Nov. 18, 1851.
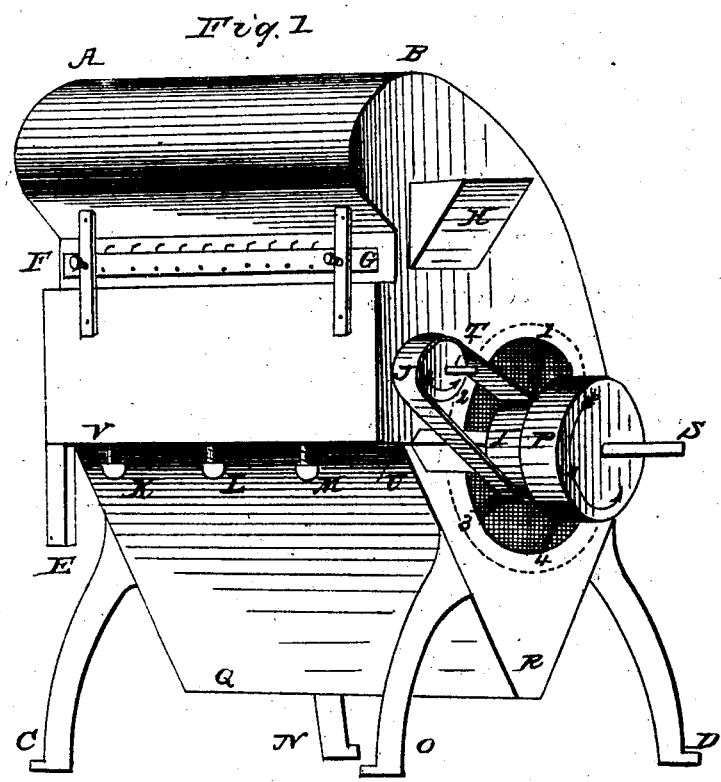

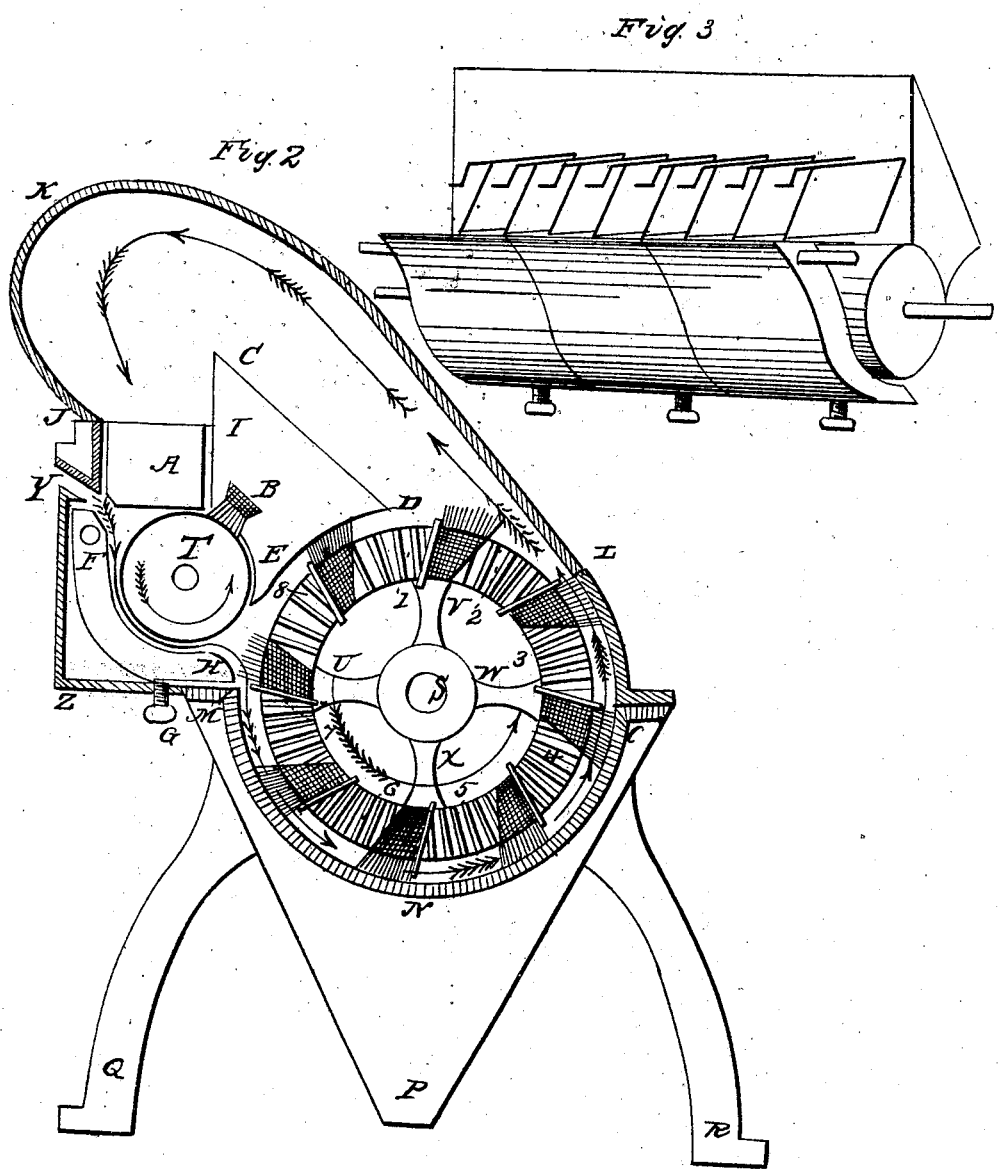

J. HOLLINGSWORTH.
Mill Bolt.

No. 8,527.

3 Sheets—Sheet 3.

Patented Nov. 18, 1851.

UNITED STATES PATENT OFFICE.

JEHU HOLLINGSWORTH, OF ZANESVILLE, OHIO.

MILL FOR GRINDING AND BOLTING.

Specification of Letters Patent No. 8,527, dated November 18, 1851.

*To all whom it may concern:*

Be it known that I, JEHU HOLLINGSWORTH, of Zanesville, of the county of Muskingum, State of Ohio, have invented a new and useful Machine for grinding and bolting wheat and other cereal grain and for grinding over and bolting middlings and bran which I call a "grinding and bolting machine;" and I do hereby declare the following is a full, clear, and exact description of the construction and operation of the same, reference being had to the annexed drawings, making a part of this specification, in which—

Figure 1 is a perspective view of the machine in its case. Fig. 2, a vertical section—or end view. Fig. 3, a view of the roller or grinder, with the three adjustable concaves or segments and the movable aprons with their cranks. Fig. 4, a view of the guides in the case or pipe, to prevent meal scattering endwise and of the inside of hopper into which the flour is bolted. Fig. 1, perspective view of machine in its case A B D C, is a view of the machine standing on its legs D O N C; which are cast iron, and form a part of each end of the machine.

S is a shaft on which is fitted the driving pulley P; this shaft S runs in "babbitt metal" boxes, which are fited in cast iron bearers, which form a part of the ends of the machine (these bearers of the shaft crossing the opening in each end). On this shaft S (which runs through the machine from one end to the other;) there are two circle flanges one at each end inside of the machine; these flanges are secured to the shaft S, by four arms 1, 2, 3, 4, which extend from the rim of the flanges *in*, toward the shaft forming an eye around the shaft; (these arms may be seen in this figure, through the open ends of the machine which are covered with wire gauze). On these flanges (inside of the machine), are fitted eight beaters, with brushes fastened to them. P is the driving pulley, by which the machine is run, and revolves in the direction of the arrow. When the driving pulley P revolves, the shaft S, to which it is secured, moves in the same direction, and also the beaters and brushes which are fastened, to said shaft, (by before described flanges). These beaters and brushes revolve in a concave, the lower half of which is covered with wire bolting cloth. I is a pulley or shaft S, between the pulley P and the end of the machine; a belt connects the pulley I to the pulley J; hence when the driving pulley P′ revolves in the direction of the arrow, the pulley J also turns in the same direction. This pulley J is secured to the shaft T which extends from one end of the machine to the other. On this shaft T inside of the case, is fitted a roller made of French bur stone, emery, or metal. The shaft T being connected with the shaft S, by means of before described belt (passing around pulleys I and J). The roller on the shaft T inside of the machine, revolves in the same direction with the brushes that are fitted on the shaft S, hence when the machine is in operation the roller and brushes (in the concave below); both revolve in the same direction. Inside of the case, are three segments or portions of concaves, which fit closely to, but do not touch the roller; they are hung at the top by a shaft passing through them, and are loose at the bottom and movable by adjusting screws K L M (Fig. 3 gives a correct view of this roller and the 3 segments or portions of concaves, that are adjustable, and independent of each other). These segments or portions of concaves are made of French bur stone, emery, or metal, and, grain passing between the roller and these segments will be crushed or ground finer or coarser, as the segments are set closer to or farther off from the roller. F G is a movable slide outside of the case, and in which the ends of the wire cranks (to which the movable aprons inside of the case are fastened), are inserted; so that by pushing this slide one way or the other, different inclinations are given to the aprons (hung on these wires inside of the machine). These aprons, (which are seen in Figs. 2 and 3), conduct, and distribute, the meal on to the roller; according to their inclination, causing the meal to pass along, slower, or faster, to its discharging end. H is the receiving or entering hopper where the grain passes into the machine. E is the discharging spout, for the bran, and offal; V Q R U is the hopper below, which receives the flour that the revolving brushes force through the wire bolting concave, which surrounds said brushes. This hopper is divided into several parts, so that each quality of flour may be kept separate.

Fig. 2 is a vertical section or end view. M N, O, is an end view of a half concave made of wire bolting cloth. 1, 2, 3, 4, 5, 6, 7, 8, is a circular flange, secured to the shaft S by arms U, V, W, X, forming an eye around said shaft; there is another similar flange on the shaft S, at the other end of the machine; between these two flanges are fitted eight beaters; end views of which, are seen in this figure, numbered 1, 2, 3, 4, 5, 6, 7, 8; to each of these beaters is fastened a brush (by means of a screw bolt); these brushes extend through the whole length of the machine; fitting up close to the flanges at either end. End views, of those brushes (fastened by screw bolts to the beaters) are seen in this figure. In revolving, these brushes, touch the wire concave M N, O; but the beaters (to which they are fastened) run one half to three quarters of an inch from the concave. M P and O P, are sides, of the hopper into which, the flour is brushed; through the wire bolting cloth concave M N, O. O, L, K, J, Y, Z, M, is an end or edge view of the case or pipe, covering the machine; and extending from the point O, (where the wire bolting half concave ends) round to the point M where it begins. F is an end view of a shaft, extending from one end of the machine to the other. The French bur stone, emery or metallic roller, is fitted to this shaft T. C D E, is an end view, of a solid partition, extending from one end of the machine to the other; the base line (of this partition) D E, is a segment, say about one eighth of the same circle, of which the wire concave M N, O, is one half; this partition (C D E,) is so placed, that the space between E, and M is open; to allow what is ground by the roller, to be thrown into the wire concave M N O; therein to be bolted; and the space between D and L is open; to allow, what has not been ground fine enough (to be bolted or brushed through the wire concave M, N, O), to be thrown up through this vacant space D L (by the centrifugal action of the beaters) over on to the roller to be ground again. B is an end view of a brush inserted in the solid partition extending the whole length of the machine. It presses against the roller, cleaning it as it revolves; A is a sheet iron apron hung, at the points I, and J, on a wire ending in a crank at J; outside of the case by pushing these cranks, by means of a slide into which they are inserted (see Fig. 1 letters F G, for said slide), any desired inclination, can be given to the aprons; there is a number of them, in the vacant space between this solid partition C D E, and the back of the case or pipe (see Fig. 3, for a better view of them edgewise). F H is an end view of a segment or portion of a concave, hung at the point F, and resting at H on the end of a screw G; it may be French bur stone, emery, or metal. G is a screw to adjust the segment F, H, to set it closer or farther off from the revolving roller; there are two or more of these segments, that press against the roller (three are seen in Fig. 3); each is independent of the other; and separately adjustable, so that different degrees of grinding (coarse and fine) can be effected, at the same time by one roller; so as to grind (as millers say) high and low at the same time. The wire concave M, N, O, in which the brushes revolve may be made of wire, of different sized meshes and each section of said concave, occupying spaces, corresponding with the segments; that press against the bur stone roller; so that should the first segment be set far off from the roller (by means of its adjusting screw) so as to grind high; that section of the wire concave, below said segment; could be covered with a wire cloth of any desired mesh, (coarse or fine), as wanted; and the other sections of the wire concave, can be covered in like manner, with wire of different size meshes to correspond, with the different degrees of grinding, that is effected, by setting, the segments closer, or farther from the roller. Also below the concave M N O, corresponding with each section (of different sized bolting wire); is a division, or partition, in the large hopper M P O so as to keep separate the different kinds of flour, that is brushed through these sections of the wire bolting concave. Instead of the manner herein described of bolting and returning the coarser material to the stone to be reground other methods may be used. For instance, the material may be allowed to fall through spouts or otherwise onto bolting reels, and then be returned by means of inclined elevators which take it up from one screen and deliver it on to another so as to regrind the coarser particles; but this method, although I do not deem it as economical, I consider as a mere modification of the general principle.

Fig. 3 is a view of the roller or grinder, with three (any other number may however, be used) concaves or segments hung at the top by a shaft passing through them and adjustable at the bottom by screws, which set them nearer or farther from the roller, as may be desired—also in this figure is a view of the movable aprons with their crank, whereby any desired inclination is given to them; they distribute and conduct the meal on to the roller and pass it more or less rapidly to its discharging end according to the inclination given to them. Instead of a series of concaves a single one may be used, and the roller and concave may stand at such inclination with each other as to diminish the space between them gradually fro mend to end, thus producing a closer grinding surface continually as the material passes on toward its exit.

Fig. 4 is a view of the guides, in the case or pipe, to prevent the meal scattering endwise in its transit from the wire concave over on to the roller; they divide the pipe or case into vertical sections. It also gives a view of the inside of the large hopper (below the wire concave) which receives the flour, after it is brushed through said wire concaves and the partitions in the large hopper to keep the different kinds of flour separate. To understand the operation of this machine refer to Fig. 2. Suppose the article to be ground and bolted be wheat; suppose the machine revolving 300 to 400 revolutions per minute, in the direction of the arrow; as the shaft S on which the brushes revolve, and the shaft T on which the roller revolves are connected by a belt as herein described of course they are both revolving in the same direction, as indicated by the arrows. Start at the hopper for grain to enter. The wheat falls between the revolving bur stone roller, and the bur stone segment F H; (the upper part of the segment F H, say at the point F, is farther off from the roller than the bottom part at H), the revolving roller crushes the wheat and forces it along on the segment, grinding it all the time, coarser or finer (as the segment may be set against the roller by the screw G) until it reaches the end of the segment at H; here, it being liberated, it is thrown into the wire bolting concave, through the open space E M where the revolving beaters and brushes force all particles of flour (that are ground fine enough) through the wire concave; and those not ground enough (which are too coarse to go through the wire bolting cloth) are carried round by the action of the beaters, and brushes, to the point L where being liberated from the concave they are forced up and over the solid partition (through the pipe) by the centrifugal action of the beaters and brushes and fall over the back of the solid partitions C D E on to the aprons A which advance them toward the discharging end more or less according to the inclination given to said aprons; and conduct them again between the segment and revolving rollers which grinds them again and forces them along, as before, into the wire bolting concave (below), where they are brushed and bolted, through the wire concave; and such particles as are still too coarse (to be bolted through said wire concave), are again returned to the roller by same process, to be reground again and again until all the flour is ground out of the wheat and bolted or brushed through the wire concave into the hopper below; and the bran or hull of the wheat (which is too coarse to go through the wire concave) is passed along to the other end, where it falls on the last apron, which instead of conducting it again between the segment and roller (as all the previous aprons did) conducts it into a spout, which carries it (the bran) outside of the machine (for this spout see Fig. 1, letter E). So that the wheat having passed in at the entering hopper; the flour ground out of it, will be found in the large hopper, below the wire bolting concave and the bran will be discharged through the spout at the opposite end of machine (as seen in Fig. 1, letter E.)

There are many respects in which this method of grinding and bolting is different from and superior to any now in use. The most prominent are—First, the plan herein described allows high and low grinding at the same time (by setting the segments at different distances from the roller) a matter of the first importance to millers, and one entirely impossible in any plan heretofore used. Secondly, much less power is required; for the moment the grain is crushed what is sufficiently fine is bolted out of the machine at once, and that which is too coarse to go through the wire bolting cloth concave, is returned to the grinding roller again, but forced through or brushed out of the wire concave the instant it is fine enough; so that what is ground fine enough is immediately forced out of the machine and not permitted to be ground over and over again to the serious injury of its quality and to the great expense of power. In this respect this plan is vastly superior to any now in use. To make this clearer—In the present modes of grinding, wheat enters the eye of one mill stone, running on the top of another ( the universal method now in use); it is ground between the faces of the two stones, by one of them running close to the other, and is forced out from the eye or center of the stone (by the centrifugal action of the running stone) to the circumference, where it is discharged. Now it must be clear that considerable portions of the grain are ground fine enough within this short distance of the eye or center of the stone, but it is impossible to relieve the stones of it, even though it be of the best quality (which it is); it must proceed along with such particles as are not sufficiently ground until the whole reaches the circumference, thereby seriously injuring the quality and heating that portion which was sufficiently ground near the eye or center; and, also consuming a vast amount of power to carry it to the circumference as every inch it proceeds out from the center the resistance is increased; all of which is avoided in the plan herein described. These two particulars viz high and low grinding at the same time; and great saving of power are of great importance in milling and mark the superiority of this machine over all others now in use. Thirdly, the bolting is performed simultaneously with the grinding. Fourthly, the machine is portable, occupying very little space; requiring no heavy timbered and expensive husk frames to set it in. Heretofore portable mills have been but miniature mills (as it were) doing work only in proportion to their size when compared with large mills but on the plan herein described a machine occupying eight or ten cubic feet, will do the grinding and bolting usually done by two run of stones, better and with less power.

Having thus fully described the nature of my invention what I claim therein as new and desire to secure by Letters Patent is—

1. The grinding of grain or other material, by means of a revolving stone or metallic roller, and one, two or more separately adjustable concaves, whereby "high and low" grinding may be performed simultaneously, and bolting the same the instant that any particles are ground fine enough, in combination with the returning onto the roller again all particles too coarse to be bolted through the bolting concave, so that they may be ground over again and again until they are fine enough to be discharged; and this I claim whether it be done by means of the revolving beaters and brushes which throw it up and through the pipe, or by any other means essentially the same.

2. I claim the guides or partitions in the pipes as herein described to prevent meal from scattering endwise in its transit from the bolting concave to the roller, in combination with the adjustable apron A on which it falls, and which distributes and governs it in its passage to the discharging end, as herein described and set forth.

JEHU HOLLINGSWORTH.

Witnessed by—
JAMES MURDOCK,
JOHN BELL.